United States Patent [19]

Lewis

[11] Patent Number: 4,930,843
[45] Date of Patent: Jun. 5, 1990

[54] HOLLOW SHELL FIBER REINFORCED RESIN IMPREGNATED BICYCLE WHEEL CONSTRUCTION AND METHOD THEREFOR

[75] Inventor: Ralph H. Lewis, Antioch, Calif.

[73] Assignee: Hamilton-Sattui, Napa, Calif.

[21] Appl. No.: 258,227

[22] Filed: Oct. 14, 1988

[51] Int. Cl.$^5$ ............................................. B60B 1/06
[52] U.S. Cl. ............................. 301/63 PW; 301/104; 301/67; 301/74
[58] Field of Search ........... 301/54, 62, 63 PW, 64 R, 301/67, 74, 95–98, 104, 105 B

[56] References Cited

U.S. PATENT DOCUMENTS 1,693,360 11/1928 Baker .......................... 301/64 R X
4,527,839 7/1985 Fujitaka et al. ........... 301/63 PW X

FOREIGN PATENT DOCUMENTS 3536308 4/1987 Fed. Rep. of Germany ...... 301/104
0220901 10/1986 Japan ..................................... 301/95
0074701 4/1987 Japan ................................... 301/104
0128803 6/1987 Japan ..................................... 301/95
0261502 11/1987 Japan .............................. 301/63 PW

OTHER PUBLICATIONS

Colnago Ferrari Concept, Milan, Milan Show Report, *American Bicyclist and Motorcyclist*, Feb. 1988, p. 10.

Primary Examiner—Russell D. Stormer
Attorney, Agent, or Firm—Townsend and Townsend

[57] ABSTRACT

A bicycle wheel is disclosed having no more than five airfoil shaped spokes linking a central hub to a peripheral rim in a blown and hollow fiber reinforced construction with resulting improvements of wheel spoke windage, overall wheel weight and rim inertia. The bicycle wheel includes a central hub and preferably three or four radially extending spokes. The radially extending spokes all have airfoil shapes. Adjacent spokes extend from the central hub and with the central hub form a spoke arch with each spoke forming one end of the spoke arch and the hub forming a central portion of the spoke arch. The distal ends of this spoke arch form the base support points for segments of the rim extending between the spokes. The segments of the rim extending between the spokes form an opposed rim arch to the spoke arch between the spoke ends. This opposed rim arch of each rim segment includes a central portion reinforced for the resistance of high tension and compression in the middle of each rim arch and is joined to the spokes at the end of each rim arch so that the central spoke arch and the peripheral rim arch oppose one another at each arch base. All rim segments together between all spokes define a conventional exteriorly open U-shaped pneumatic tire holding slot of conventional circular dimension. At one of the rim arches, a point of arch stress reversal is chosen for the placement of the necessary singular pneumatic tire valve.

14 Claims, 3 Drawing Sheets

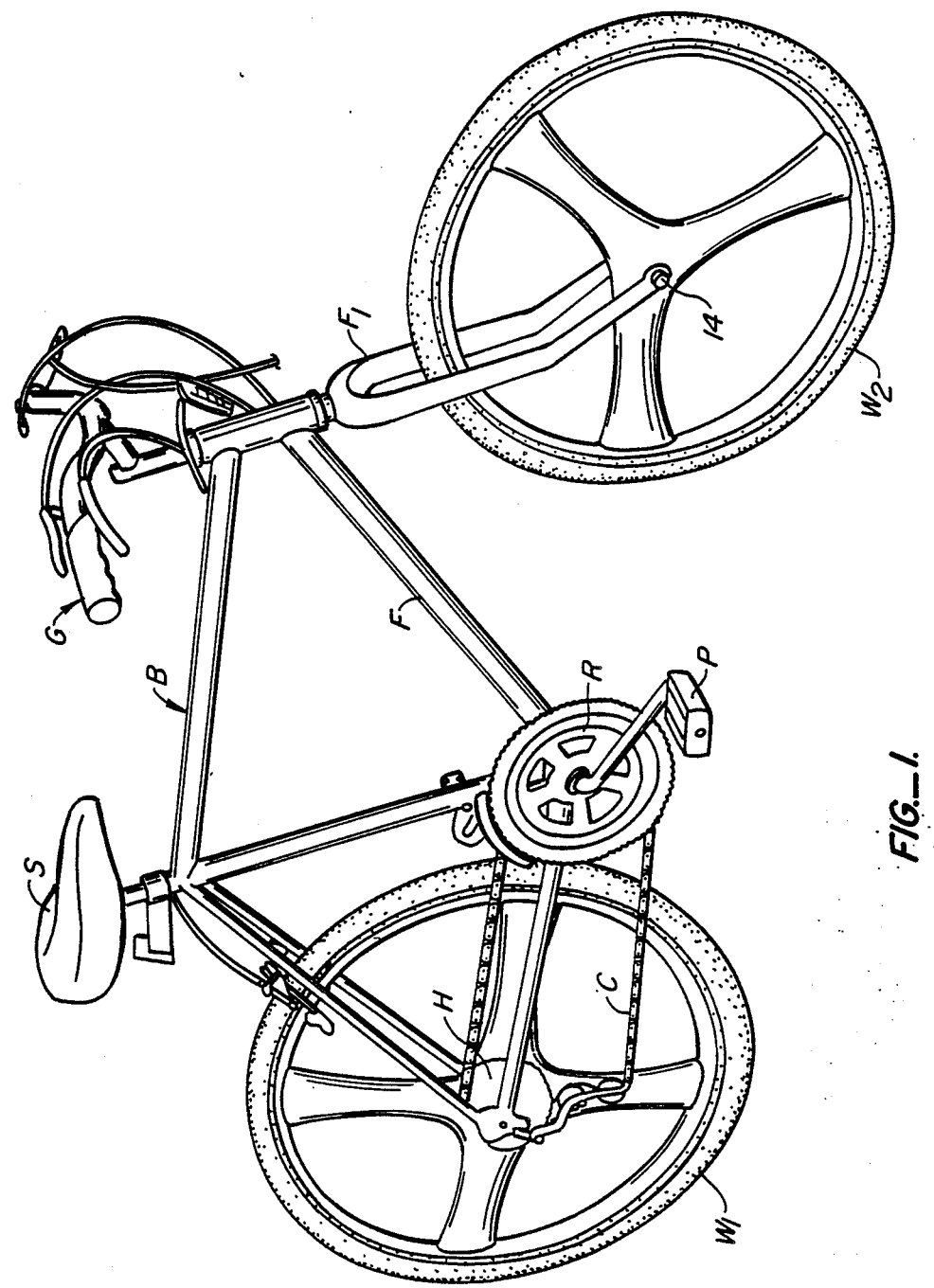
FIG._1.

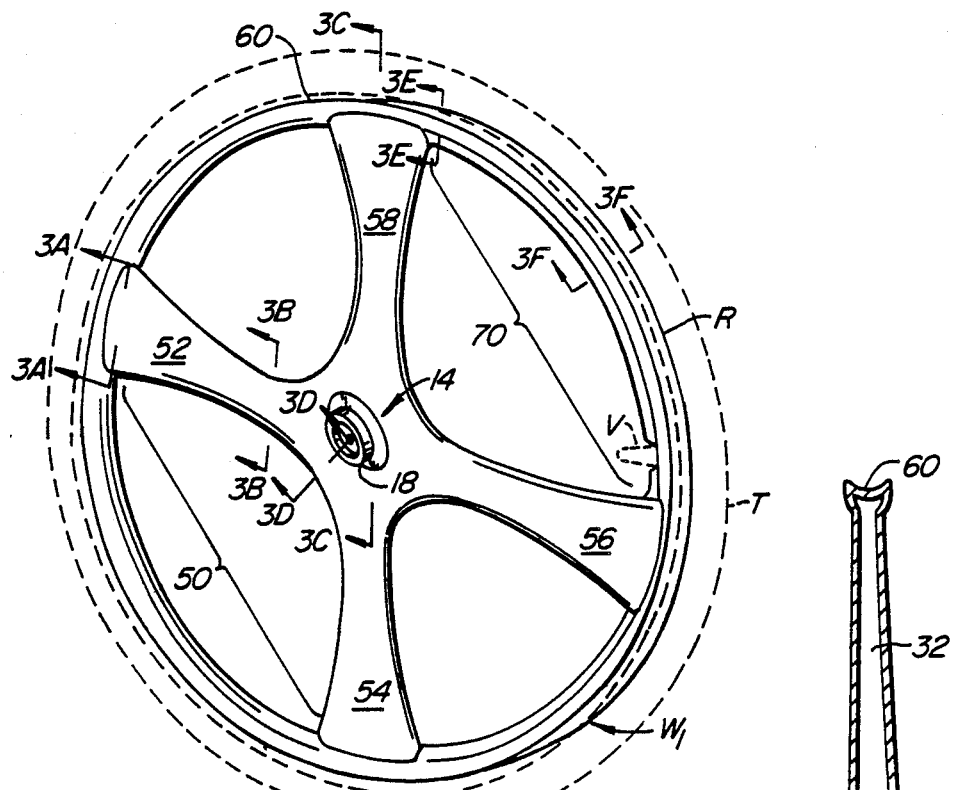
FIG._2.
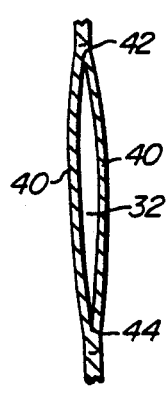
FIG._3A.
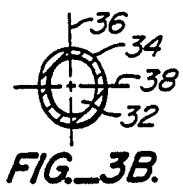
FIG._3B.
FIG._3E.
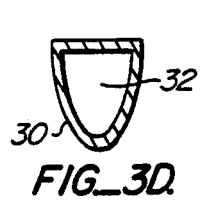
FIG._3D.   FIG._3F.
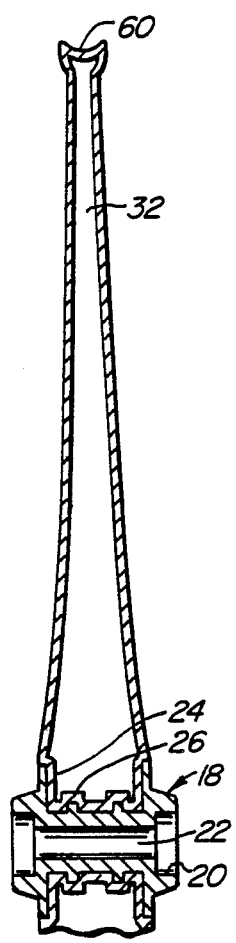
FIG._3C.

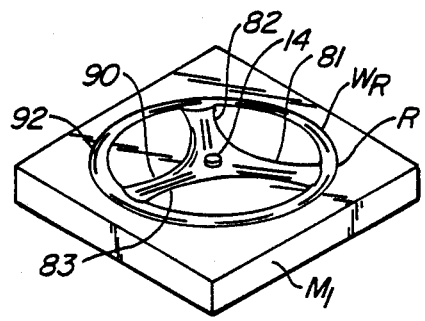
FIG._4A.
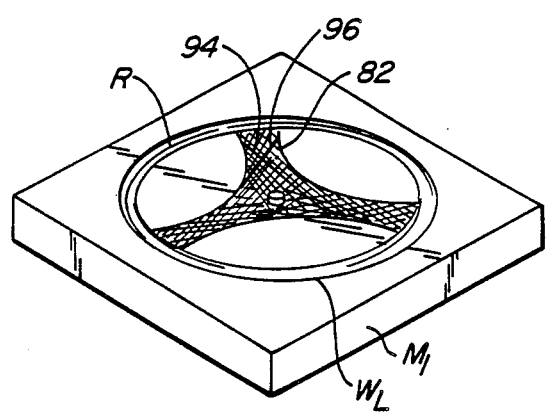
FIG._4B.
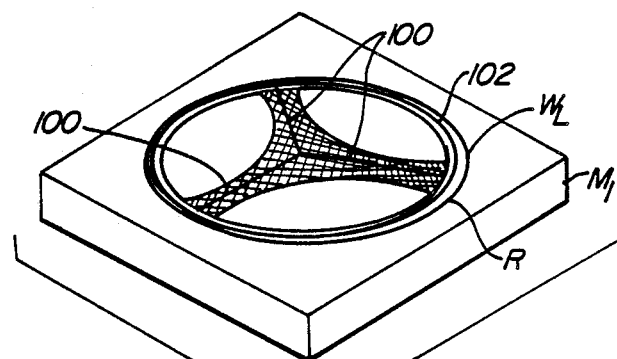
FIG._4C.
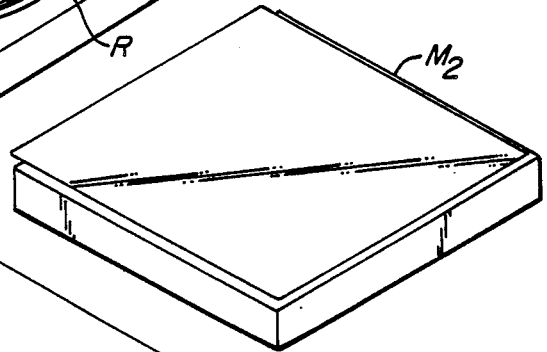
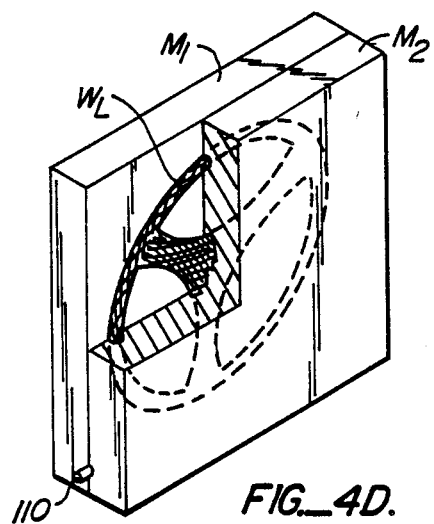
FIG._4D.

HOLLOW SHELL FIBER REINFORCED RESIN IMPREGNATED BICYCLE WHEEL CONSTRUCTION AND METHOD THEREFOR

This invention relates to resin impregnated fiber reinforced construction for a bicycle wheel. More particularly, a lightweight bicycle wheel having reduced inertia and aerodynamic spokes together with a method for manufacturing the same is disclosed.

BACKGROUND OF THE INVENTION

Conventional bicycle wheels suffer from at least three infirmities which are known to decrease their effectiveness. These infirmities include spoke windage, weight and weight distribution.

In order to understand spoke windage, the case of a bicycle with conventional spokes moving over the ground can be considered. Spoke windage develops from the spokes of the conventional bicycle wheel as they move through the air. Taking the example of the bicycle moving at 30 mph it will be understood that the bicycle tire at the point of ground contact has no velocity relative to the ground. However, the bicycle wheel at the upward portion of the rim directly over the point of ground contact has a rim velocity twice that of the speed of the bicycle over the ground. In the case of a bicycle moving at 30 mph, this rim velocity is 60 mph. At such high rim speeds, the round spokes of a conventional bicycle wheel create much turbulence and drag resistance as they pass through the air. Indeed, the relationship of the spokes following closely one after another through the air contributes to this turbulence.

In an effort to reduce this turbulence and drag resistance, some bicyclists have attempted to stretch membranes across the rim of their bicycle wheels. These membranes cover the spokes and reduce the air drag caused by the spoke windage. This can be a satisfactory solution in limited circumstances when there is either no wind or the wind relative to the bicycle comes from directly in front of the bicycle or directly behind the bicycle. Unfortunately, when there is any wind component perpendicular to the direction of bicycle motion, the membrane acts more as a sail. The membrane in acting as a sail catches the wind creating balance and stability problems not present in the absence of the membrane. In short, in any condition of wind, the membrane detracts from the bicycle speed whenever the bicycle turns to have a wind component at an angle to the bicycle.

A second disability of conventional bicycle wheels is that of weight. A conventional bicycle wheel has a rim, a hub, and spokes all under tension extending from the rim to the hub. The spokes under tension place the rim of the bicycle in hoop compression. This hoop compression requires that the rim be strong.

The load of the bicycle and bicyclist when placed on such bicycle wheels further increases the need for rim strength. Typically, the weight of the bicycle and rider adds to the hoop compression. This addition to hoop compression occurs at the point of ground contact of the wheel. This added hoop compression is then transferred from the bottom of the wheel rim to the top of the wheel rim in hoop compression around the wheel rim. At the top of the wheel rim, the spokes, through added tension effectively hang the hub of the bicycle wheel from the top of the rim. When it is remembered that the bicycle wheel must be constructed to anticipate dynamic loadings, as where the rider hits a bump in the road, it can be seen that the rim needs to be thick and heavy relative to the rest of the wheel.

As a third disability, conventional bicycle wheels suffer from inefficient weight distribution, this inefficient weight distribution concentrating the weight at the periphery of the wheel. Where weight of the rotating bicycle wheel is concentrated at the rim, greater effort is required to change the angular velocity of the wheel. Simply stated, a bicyclist when accelerating the bicycle must expend more energy in order to have the bicycle go faster. Likewise, when brakes must be applied, the braking system extracts more energy as the bike moves from a fast speed to a slower speed.

It should be understood that where the overall weight of two wheels is the same, a wheel having weight distribution to and towards the hub is always to be preferred over a wheel having weight distribution to and towards the rim. Unfortunately, and because of the rim compression previously set forth, conventional bicycle wheels cannot have weight distribution away from the rim without becoming endangered of collapse.

SUMMARY OF THE PRIOR ART

It is known in bicycle wheels to have a standard rim in the range of 27 inches in diameter with three airfoil shaped spokes. Such a bicycle has been sold under the name Colnago of Italy. That product differs from the following disclosure in at least these aspects:

First, the three spokes are used on wheels in the range of 27 inches. We do not utilize three spokes in this arrangement because the static and dynamic properties of materials require thickening of the wheel to the point where savings in both weight and moment of inertia (wheel speed change) are lost.

Second, the spokes of this article are arcuate in the direction of forward wheel rotation. They join to the hub at a slope relative to the radial direction. Because of this slope relative to the radial direction, they form a discontinuity at the point of spoke joinder to the hub. An arch, in the sense that one is set forth in this disclosure, cannot be formed between adjacent, paired spokes.

Third, at least the hub is not of hollow shell construction as herein disclosed. There is insufficient separation between the material of the hub and the bearing axis of the wheel. This prevents the formation of an arch between adjacent spoke pairs as required herein. Further, it imparts to the spokes at the point of joinder to the hub the tendency to separate from the hub under high loadings, as where a bicycle hits an obstacle such as a rut in a road. Further, attempts to increase the material of the hub lead to weight gain of the wheel, resulting in comparable weight to conventional bicycle wheels.

Fourth, the wheel includes a conventional aluminum rim, imparting to the wheel a part plastic, a part metal composition. There results the prospect of corrosion.

SUMMARY OF THE INVENTION

A bicycle wheel is disclosed having no more than five airfoil shaped spokes linking a central hub to a peripheral rim in a blown and hollow fiber reinforced construction with resulting improvements of wheel spoke windage, overall wheel weight and rim inertia. A heated two-part hollow mold is utilized to form and cure the bicycle wheel, the parts of the mold coming together to form a hollow concavity having an interior dimension complementary to the finished exterior dimension of the finely fabricated bicycle wheel. The bicycle wheel includes a central hub and preferably three or four radially extending spokes. The radially extending spokes all have airfoil shapes, the leading and trailing edges of the airfoil shapes extending in the plane of wheel rotation to reduce spoke windage. Adjacent spokes extend from the central hub and with the central hub form a spoke arch with each spoke forming one end of the spoke arch and the hub forming a central portion of the spoke arch. The distal ends of this spoke arch form the base support points for segments of the rim extending between the spokes. The segments of the rim extending between the spokes form an opposed rim arch to the spoke arch between the spoke ends. This opposed rim arch of each rim segment includes a central portion reinforced for the resistance of high tension and compression in the middle of each rim arch. Each rim arch is joined to the spokes at the ends so that the central spoke arch and the peripheral rim arch oppose one another at each arch base. All rim segments together between all spokes define a conventional exteriorly open U-shaped pneumatic tire holding slot of conventional circular dimension. On one of the rim arches, at a point of arch stress reversal, an aperture is placed for the necessary singular pneumatic tire valve. The process of construction includes laying up resin impregnated fiber on the mold surfaces, placing a central bladder, closing the mold so as to trap the bladder between the resin impregnated fibers, inflating the bladder to expand the fibers to the outer surface concavity of the mold, and curing the finally constructed hollow bicycle wheel against the mold periphery. It is preferred, but not required, that the rim be of hollow shell construction.

OTHER OBJECTS, FEATURES AND ADVANTAGES OF THIS INVENTION

It is an object of this invention to disclose a hollow shell bicycle wheel construction having airfoil shaped spokes. Accordingly, a bicycle wheel is disclosed in which no more than five spokes and preferably three or four spokes are given an airfoil configuration, especially at their points adjacent the wheel rim. This airfoil shape, disposed at that point on the spokes where windage is the highest effects minimum turbulence of the spoke with the air as the bicycle passes over the ground.

An advantage of the disclosed spoke shape is that inherent efficiency is imparted to the wheel. By reducing spoke windage, drag and wind resistance of the bicycle wheel is likewise reduced.

A further object of this invention is to disclose a bicycle wheel having overall reduced weight. In accordance with this aspect of the invention, a unique opposed arch construction of hollow fiber reinforced resin is disclosed. The arches include a spoke arch which includes the hub as its central portion and paired spokes at the respective ends of the spoke arch. This spoke arch is opposed by a rim arch. The rim arch includes that rim segment running between the ends of the spokes. The rim arch is reinforced at the center to absorb known increased forces of tension and compression. At the same time, and at the point of arch stress reversal, the rim defines a convenient point for the placement of the necessary pneumatic tube for the tire.

An advantage of this aspect of the invention is a dramatic reduction in overall bicycle wheel weight. As an example, the wheel in accordance with this construction can weigh as little as 600 grams when compared to a standard racing bicycle wheel having a weight in the order of 1,000 grams.

A further advantage of this construction is strength. Specifically by having a hollow shell fiber reinforced resin construction, a bicycle wheel is disclosed which has strengths equivalent to or better than conventional wheel construction.

Yet another object to this invention is to disclose a bicycle wheel in which the weight of the wheel is moved to and towards the hub and less weight is concentrated at the rim. Simply stated by utilizing the opposed spoke arch and rim arch construction, weight relocation towards the hub occurs.

An advantage of this disclosed construction is that changes of bicycle speed absorb less work from the bicyclist. For example, a bicycle rider utilizing the wheel of this invention can accelerate faster with less effort. Likewise, when brakes must be applied, stopping of the bicycle consumes less work. This being the case, a bicycle rider utilizing the wheels of this invention has, in a racing situation, a competitive advantage. For touring, the bicycle rider can go further with less energy output. In short, a superior wheel is disclosed.

A further object of this invention is to set forth a mold construction process for such a bicycle wheel. According to this aspect of the invention, a mold defining an interior concavity is made. The interior concavity of the mold has an interior dimension precisely corresponding to the desired exterior dimension of the finished bicycle wheel.

Resin impregnated carbon fibers are laid on the exterior surfaces of the mold. Preferably, a split mold construction is used with fibers being placed on the mold surfaces on either side thereof. Before mold closure, a bladder is placed in the mold between the fibers. It is preferred that the rim, as well as the hub and spokes, be of hollow shell construction but this is not required.

A fiber orientation is disclosed. This fiber orientation includes radially disposed fibers extending from the hub towards the rim in the spokes. Likewise the fiber construction includes circumferentially disposed fibers on the rim between the spokes. Both the radially disposed fiber and the circumferentially disposed fibers are reinforced by successive fiber layers being laid at 30° angles. Thus, the radial spokes include not only the radially extending fibers but groups of fibers extending at 30° to the radial angle. Likewise, the rim includes not only circumferentially extending fibers but fibers laid at 30° angles with respect to the circumference. It has been found that the finally cured, hollow shell, fiber constructed wheel has high strength characteristics.

An advantage of the disclosed high strength characteristics is that the side-to-side flexure of the bicycle wheel is practically nonexistent. As an example, it is possible to place the disclosed bicycle wheel supported on opposite portions of the rim on bricks and for one or two men to stand in the center of the wheel. The wheel under such a static test does not collapse whereas conventional bicycle wheels do collapse.

Yet an additional advantage of the disclosed bicycle wheel is that it is absolutely stiff. Not only does the wheel have improved resistance in turning, the wheel also includes lack of yielding in stress as energy is applied through the wheel for bicycle forward motion. An example of the advantage of this stiffness is in hill climbing.

Specifically, in hill climbing where a conventional bicycle wheel is utilized, the conventional tension spokes in transmitting torque from the hub to the rim yield responsive to the stress placed on the spokes by the torque exerted by the rider. This yielding effects an imperfect translation of the energy of the rider into the hill climbing effort. The disclosed bicycle wheel effects little or no such stress yielding in the hollow fiber reinforced resin shell construction. Consequently, a bicycle rider utilizing this wheel in an uphill climb is given an advantage.

BRIEF DESCRIPTION OF THE DRAWINGS

Other objects, features and advantages of this invention will become more apparent after referring to the following specification and attached drawings in which:

FIG. 1 is a perspective view of a bicycle, the bicycle having a reduced diameter 24 inch three spoke wheel placed at the forward turning and steering fork and a conventionally sized four spoke wheel placed at the rear driven sprocket, it being understood that the bicycle of FIG. 1 is chosen in its wheel combination to illustrate two types of bicycle wheels according to this invention:

FIG. 2 is a perspective view of the hollow shell four spoke wheel construction of this invention having section lines taken through the wheel to illustrate the hollow shell construction;

FIG. 3A is a section of a spoke taken at the hub to illustrate the airfoil construction:

FIG. 3B is a section of a spoke taken adjacent the hub to illustrate an elliptical spoke construction:

FIG. 3C is a section taken through the spoke longitudinally of the spoke to illustrate the wheel construction:

FIG. 3D is a section through the hub of the wheel only illustrating the hub;

FIG. 3E is a section of the rim arch adjacent the spoke illustrating the wheel construction:

FIG. 3F is a section of the rim arch chosen taken medially between the spokes;

FIG. 4A is a picture of one mold half, this picture illustrating the radially extending fibers in the spokes and the circumferentially extending fibers in the rim:

FIG. 4B is an illustration similar to FIG. 4A of one-half of the mold, this figure showing the radially extending fibers and the circumferentially extending fibers, now reinforced by successive layers of resin impregnated fiber placed at 30° angles to the original circumferential and radially extending fibers:

FIG. 4C illustrates the two halves of the mold construction about to be placed together with one-half having a bladder placed therein, this bladder having the purpose of expanding and forcing the respective resin impregnated fiber for curing to the outside portion of the mold; and FIG. 4D is a cutaway view of the mold being heated in the curing process wherein the bladder has been fully expanded and the resin impregnated fibers have been forced to the outside of the heated mold for curing.

Referring to FIG. 1, a conventional bicycle B is illustrated having a turning fork F and a seat S all mounted to a conventional bicycle frame F. As well known in the art, pedals P rotate a sprocket R, which sprocket R by means of a gear connected derailing bicycle chain C causes a driving hub H to rotate a rear wheel W1. Likewise, as fork F turns responsive to hand grips G, front wheel W2 turns.

For purposes of example, we disclose herewith two sizes of wheels. As can be seen, wheel W2, having three spokes is smaller and less than 25 inches in diameter and in the order of 24 inches in diameter. It has been found that such wheels can be faster in certain racing conditions because, among other things, that segment of the wheel having high spoke windage is reduced. Further, such wheels have less mass more distant from their respective hubs 14 and this enables the wheels to accelerate and decelerate with greater ease.

Wheel W1 is more conventional. It is a wheel greater than 25 inches in diameter and in the order of 27 to 28 inches diameter and has four spokes. It has been found that in larger diameter wheels, having four spokes provides for an optimum construction. Specifically, the additional spoke keeps the rim wheel weight at a lower requirement. At the same time, the four spokes are not so numerous as to create interfering windage one with another as they pass through the atmosphere.

Because wheel W1 is the most commonly used diameter, its construction will be illustrated with respect to FIGS. 2 and 3. Molding of wheel W2 will be set forth with respect to FIGS. 4A-4D. The reader will understand that I prefer a bicycle with reduced diameter wheels W2.

Referring to FIG. 2, wheel W1 is illustrated. Wheel W1 has a tire T schematically shown in broken lines. The reader will understand that tire T is completely conventional and has no change over the prior art. Tire T includes a valve V extending through a point in the wheel rim R.

In discussing the disclosed bicycle wheel, the hub will first be set forth. Thereafter, the radially extending spokes will be described. Finally, the rim construction will be set forth.

Hub 14 includes a molded axle bearing housing 18. Axle bearing housing 18 can be of conventional construction. As shown in FIG. 3C, bearing housing 18 includes bearing raceways 20, a cross shaft portion 22 and is keyed to the fiber construction by suitable keys 24, 26. The reader will understand that the fibers utilized in constructing the wheel can be connected to the bearing section 18 so that the wheel efficiently transmits torque from any hub H (see FIG. 1).

Referring to FIG. 3D, the hollow fiber reinforcement of the hub can be understood. Specifically, cured fiber reinforced resin walls are illustrated with a central evacuated portion 32.

The spoke construction is likewise easily understood. Adjacent the hub, the spokes include a somewhat elliptical section 34 with the major axis of the ellipse 36 being in the direction of wheel rotation and the minor axis of the ellipse 38 being perpendicular to wheel rotation. As before, a void 32 is described interior of the spoke.

As the spoke proceeds outwardly to and towards the wheel rim R, the spoke becomes an airfoil shaped segment. Referring to section 3A-3A taken at the rim, the overall airfoil shape can be understood. Referring simultaneously to FIGS. 2 and 3A, it can be seen that again a hollow concavity 32 is defined. This concavity includes fiber walls 40 on either side thereof. Immediately before the rim and as shown in broken lines, it can be seen that the leading edge 42 and the trailing edge 44 of the airfoil shaped spoke are disposed in the plane of wheel rotation. This disposition enables the spoke to pass through the air with minimal windage.

It will be understood that a spoke arch 50 is formed by spokes 52 and 54 with hub 14 being therebetween. Hub 14 forms the central portion of the spoke arch. Spoke 52 forms one end of the spoke arch while spoke 54 forms the opposite end of the spoke arch 50. It is this arch construction which imparts strength to the wheel.

Likewise, it will be understood that each pair of spokes forms a spoke arch. For example, spokes 54 and 56 form such an arch. Likewise, spokes 56 and 58 form such an arch. Finally, spokes 58 and 52 form such an arch.

The construction of rim R can now be understood.

Rim R forms a conventional U-sectioned pneumatic tire receiving slot 60. Slot 60 is circular around the outside of the rim and has the U-shape exposed outwardly of the wheel. It conventionally captures a pneumatic tire T and is interrupted only for placement of the valve V.

I prefer that the rim be of hollow shell construction. This, however, is not required. Specifically the rim can be molded of solid construction utilizing the inherent strength of the tire receiving slot to resist loading in tension and compression.

In the particular wheel construction here shown, the rim tapers in construction. Specifically, the rim has a narrow section illustrated at section 3E of FIG. 2 and shown in FIG. 3E. This section, adjacent the spokes, is at a point where tension and compression forces act on the ends of a rim arch 70 formed between the ends of the spokes (see that portion of rim R between the ends of spokes 56, 58). In the middle of rim arch 70, in the particular embodiment illustrated here, rim arch 70 is given an expanded section 65. This expanded section disposes the resin impregnated fibers further from the axis of the arch.

As is known and conventionally understood in the static and dynamic analysis of such structures, the dispositions of the fibers away from the neutral stress axis of the rim arch 70 enables those fibers to transmit greater strength. Since the central portion of the rim arch 70 comes under the greatest tension and compressive stresses in resisting loading on the wheel, the expanded section illustrated in FIG. 3F is desirable.

The reader will understand that the section illustrated in FIG. 3E could as well be used in this juncture. For the section to be utilized at that point, additional layers of resin reinforced fibers would be utilized in the construction of the wheel. In actual fact, such a construction is preferred as the shape of the rim in rotation does not change.

Just as differing spoke arches are defined between spoke pairs, similar rim arches are defined between spoke pairs.

It is believed that FIGS. 2 and 3A through 3F constitute a complete disclosure of the preferred article of this invention. With respect to FIGS. 4A through 4D, the fabrication of the preferred 24 inch diameter wheel W2 will now be set forth.

Referring to FIG. 4A, a first mold half M1 is illustrated only. The mold half defines half of that female concavity necessary for defining three spokes 81, 82, 83 and the rim R.

A singular layer of fibers 90 has been laid to each of the spokes. The fibers extend from a hub 14 to the rim R in the radial direction.

Likewise, a layer of fibers 92 has been placed on the rim R. Fibers 92 extends circumferentially around the wheel.

The reader will understand that it is the orientation of fibers 90 and 92 which define the general stress conditions of the wheel.

Referring to FIG. 4B, mold M1 is shown with additional fibers placed thereto. Specifically, spoke 82 is shown with a first group of fibers 94 at a 30° angle with respect to the radially extending fibers 90. Likewise, a second group of fibers 96 has been disposed at a 60° angle with respect to fibers 94 or a 30° angle in the opposite direction with respect to fibers 90.

The reader will understand that precisely the same thing has occurred at rim R. Specifically, fiber layers have been placed at 30° angles to the originally circumferentially laid fibers 92. Due to the scale of the drawings, these fibers must be understood from those of the illustrated spoke 82.

Referring to FIG. 4C, mold M1 is shown about to be joined with mold section M2. In both of the respective mold sections M1 and M2, it will be understood that fibers have been laid. Further, the reader will understand that the juncture between the mold joinders has likewise been extended with fiber layers. That is to say, there is no appreciable interruption in the overall fiber structure as the molded product cures in between the interstitial sections of the respective molds.

Referring further to FIG. 4C, a bladder 100 has been placed in the spoke and hub section of the mold. Likewise, a bladder 102 extends around the rim section R of the mold. These respective bladders 100 and 102 are inflated after the mold is closed for the curing of the fiber.

Referring to FIG. 4D, the mold at sections M1, M2 is shown closed. In the interior it defines a hollow mold dimension. This hollow mold dimension has an inside dimension precisely complementary to the outside dimension of the finished wheel. Bladder B has been inflated by conventional inflating expedients. For example, the inflation can occur by the introduction of gas at an aperture 110 defined in the mold. As is also conventional in the art, the respective mold sections M1, M2 are heated. This heating takes the resin impregnated fiber layers, activates the resin to curing temperatures, and after an appropriate time in the heated state causes curing. After a suitable period of curing in the mold, the respective mold halves M1, M2 are opened and the cured and completed fiber wheel is removed.

The reader will understand that the blown fiber construction techniques here illustrated are relatively conventional. They are unconventional insofar as they are applied to a bicycle wheel and utilized in the fiber reinforced construction here specifically illustrated.

I claim:

1. An improved bicycle wheel including a hub for defining a bicycle wheel axis, a plurality of radially extending spokes extending from said hub outwardly to a surrounding rim supported at the distal ends of said spokes from said hub, said rim defining a concavity for receiving a bicycle tire, the improvements comprising:
    a bicycle wheel bearing housing;
    a central hub around said bicycle wheel bearing housing, said central hub having a hollow resin fiber reinforced construction around said bicycle wheel bearing housing, said hollow resin fiber reinforced construction defining a vacant interior to said hub with a fiber reinforced resin shell on the exterior;
    a plurality of no more than five radially extending spokes having hollow resin fiber reinforced construction, each said spoke commencing at said hub and extending radially outward from said hub to the rim of said bicycle wheel;

paired adjacent spokes defining through the central hub of said wheel a spoke arch with one spoke of said spoke pair forming one end of said spoke arch, the other spoke of said spoke pair forming the opposite end of said spoke arch, and said hub forming the medial section of said spoke arch therebetween;

a rim having resin fiber reinforced construction extending peripherally around the wheel, said rim as extending between the ends of paired adjacent spokes forming a rim arch with said rim arch at one spoke of the spoke pair forming a first rim arch end, the rim arch at the other spoke end of each spoke pair forming a second rim arch end and the section of the rim between the spokes defining the central portion of said rim arch; and the central portion of said rim arch reinforced by fiber reinforced construction for receiving maximum forces of rim arch compression and tension between said spoke pair.

2. The invention of claim 1 and wherein said plurality of radially extending spokes are airfoiled shaped with a leading and trailing edge of said airfoil disposed in a plane normal to said bicycle wheel axis.

3. The invention of claim 1 and wherein said bicycle wheel spokes adjacent said hub includes an elliptical shape with the major axis of said ellipse normal to said bicycle wheel axis and the minor axis of said ellipse parallel to said bicycle wheel axis.

4. The invention of claim 1 and wherein said central hub of said bicycle wheel at the point of joinder to said radially extending spokes defines a hollow concavity.

5. The invention of claim 1 and wherein said spokes at the point of joinder to said rim defines a hollow concavity.

6. The invention of claim 1 and wherein said wheel includes three spokes.

7. The invention of claim 1 and wherein said wheel rim is of hollow shell construction.

8. The invention of claim 1 and wherein the medial portion of said rim arch is reinforced for receiving maximum forces of rim arch compression and tension by placement of additional fiber and resin and has the same section as said portion of said rim arch adjacent said spokes.

9. An improved bicycle wheel comprising:
a bicycle wheel bearing housing;
a central hub around said bicycle wheel bearing housing, said central hub having a hollow resin fiber reinforced construction around said bicycle wheel bearing housing, said hollow resin fiber reinforced construction defining a vacant interior to said hub with a fiber reinforced resin shell on the exterior;

a plurality of no more than five radially extending spokes having hollow resin fiber reinforced construction, each said spoke commencing at said hub and extending radially outward from said hub to the rim of said bicycle wheel;

paired adjacent spokes defining through the central hub of said wheel a spoke arch with one spoke of said spoke pair forming one end of said spoke arch, the other spoke of said spoke pair forming the opposite end of said spoke arch, and said central hub forming the medial section of said spoke arch therebetween;

a rim having a resin fiber reinforced construction extending peripherally around the wheel, said rim as extending between the ends of paired adjacent spokes forming a rim arch with said rim arch at one spoke of the spoke pair forming a first rim arch end, the rim arch at the other spoke end of each spoke pair forming a second rim arch end, and the section of the rim between the spokes defining the central portion of the rim arch;

the central portion of said rim arch reinforced by fiber reinforced construction for receiving maximum forces of rim arch compression and tension between said spoke pairs;

a rim valve aperture;

a pneumatic valve threaded through said rim valve aperture; and, a pneumatic tire connected to said valve and disposed in the rim of said wheel whereby a tire threaded to said wheel may be inflated through said valve and captured at said rim.

10. The invention of claim 9 and wherein said bicycle wheel includes four spokes.

11. The invention of claim 9 and wherein said spokes taper from said hub to said rim.

12. The invention of claim 9 and wherein said spokes taper from said hub to said rim and define airfoils immediately adjacent said rim having a leading edge and a trailing edge;
said leading edge and said trailing edge of said airfoils being disposed in the plane of rotation of said bicycle wheel about said bicycle wheel axis.

13. The invention of claim 9 and wherein said bicycle wheel includes a hollow construction at said rim.

14. The invention of claim 9 and wherein said bicycle wheel includes three spokes.

* * * * *